(12) United States Patent
Moffett et al.

(10) Patent No.: US 6,269,901 B1
(45) Date of Patent: *Aug. 7, 2001

(54) HYDRAULIC DRIVE SYSTEM

(75) Inventors: Robert Moffett; Carol Moffett; James McAdam, all of Clontibret; Paul Quinn, Castleblaney; Gerard McHugh, Carrickmacross; Gerard Harte, Castleblaney; Andrew Wylie, Ballybay; Martin McVicar, Killybrone; Thomas Cadden, Monaghan, all of (IE)

(73) Assignee: Moffett Research and Development Limited, Clontibret (IE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/883,960

(22) Filed: Jun. 27, 1997

(30) Foreign Application Priority Data

Jun. 28, 1996 (IE) .................................................. S960478
Nov. 6, 1996 (IE) .................................................. S960778
Mar. 27, 1997 (IE) .................................................. S970235

(51) Int. Cl.[7] .................................................. B60K 8/00
(52) U.S. Cl. .......................................... 180/308; 180/212
(58) Field of Search .................................. 180/243, 245, 180/246, 305, 308, 212; 60/421, 424, 427

(56) References Cited

U.S. PATENT DOCUMENTS

| 2,541,290 | * | 2/1951 | Robinson | 60/424 |
|---|---|---|---|---|
| 2,541,292 | * | 2/1951 | Robinson | 60/421 |
| 3,442,344 | * | 5/1969 | Ocule | 60/424 |
| 3,641,765 | * | 2/1972 | Hancock et al. | 180/308 |
| 3,952,511 | | 4/1976 | Turner et al. | . |
| 3,997,017 | * | 12/1976 | Campbell et al. | 180/243 |
| 4,236,595 | | 12/1980 | Beck et al. | . |
| 4,635,743 | | 1/1987 | Riehl | . |
| 4,649,706 | * | 3/1987 | Hutson | 60/424 |
| 5,201,570 | | 4/1993 | Heren et al. | . |
| 5,546,751 | * | 8/1996 | Last | 60/424 |
| 5,960,628 | * | 10/1999 | Machesney et al. | 60/424 |

FOREIGN PATENT DOCUMENTS

| 0547947 | 6/1993 | (EP) . | |
|---|---|---|---|
| 2281944 | 3/1995 | (GB) . | |
| 65047 | 10/1995 | (IE) . | |
| 1281450 | * 1/1987 | (SU) | 180/308 |

* cited by examiner

Primary Examiner—Frank Vanaman
(74) Attorney, Agent, or Firm—Jacobson Holman, PLLC

(57) ABSTRACT

A hydraulic drive system incorporating a hydraulic pump for three wheeled vehicles such as "piggy back" forklifts in which there are at least two separate but linked drives forming one drive unit for each of the wheels and each drive has a separate input and output. Valving is provided to provide both parallel and series operation of the system for optimum torque, speed and anti skid operation. In one preferred way of carrying out the invention a single drive unit feeds one of the drives of each of the other drives. The hydraulic pump feeds the single drive unit and one of the drives of the other transverse drive units. By-pass diverter valves are fitted across the drives of the transverse drive units.

4 Claims, 1 Drawing Sheet

HYDRAULIC DRIVE SYSTEM

BACKGROUND OF THE INVENTION

1. Field of the Invention

This invention relates to a hydraulic drive system for three wheeled vehicles.

Typically such three wheeled vehicles have three independent wheel drive shaft assemblies in an essentially triangular configuration namely one transversely in-line pair of drive shaft assemblies and a single wheel drive shaft assembly longitudinally spaced from the in-line pair. While there may be more than one wheel on each drive shaft whether side by side or spaced some distance apart such arrangements are still considered as three wheeled vehicles; the shafts and wheels being considered to be one wheel. Generally speaking the hydraulic drive system comprises a hydraulic pump and a drive unit directly coupled to each of the drive shaft assemblies namely a single drive unit and a pair of transverse drive units.

The invention is particularly directed to hydraulic drive systems for forklift trucks and the like vehicles and in particular for forklift trucks such as are sold under our Trade Mark MOUNTY which can be carried from site to site on the back of vehicles, in what is known as a "piggy back" fashion.

2. Background Information

Our Irish Patent No. 65, 047 discloses a forklift truck having a hydraulic fluid supply divider for controlling the supply of hydraulic fluid delivered between an hydraulic pump and the front and rear wheel drive motors of the forklift truck. Essentially in this system the front wheel drive motors form the in-line pair of drive units and the rear wheel drive motor forms the single drive unit. This hydraulic drive system ensures positive drive to all wheels such as desirable in many off-road situations for example on building sites. In operation, the fluid delivery from the pump is split by a fluid divider between the front and rear wheels of the forklift truck. This fluid divider works well and is effective. In some conditions, it is difficult to ensure exactly the same fluid supply to each of the wheels and some slippage can occur.

For example a somewhat similar system is described in U.S. Pat. No. 5,201,570 which describes what is suggested is a wheeled vehicle equipped with a simple and efficient anti-skid system for its wheels where restriction is placed on the supply conduit of each hydraulic motor coupled to the rear wheels and a restriction is placed on the exhaust conduit of each motor coupled to the front wheels. This while reasonably effective does not overcome the basic problems in operating such vehicles and this U.S. patent together with our Irish Patent Specification No. 65, 047 describe one particular way of solving this problem.

Many other elaborate systems of control and operation of hydraulic drive systems have been devised and the inventions of U.S. Pat. Nos. 3,952,511, 4,236,595 and 4,635,743 typify the complex and costly arrangements.

European Patent Specification No. 547, 947 describes an arrangement of an hydraulic drive system for a three wheel vehicle. In this hydraulic drive system there is the single drive unit formed from a drive provided by one hydraulic motor and the transverse drive units are provided by what are in effect two hydraulic motors. In fact the hydraulic motors are not separate hydraulic motors but indeed are the one hydraulic motor. Such hydraulic motors are generally of the radial piston type where all of the cylinders can be fed periodically with fluid under pressure or else the feed of the fluid under pressure can be interrupted to some or all of the pistons which correspond to an intermediate capacity. Still further the cylinders can be separated to effectively form two separate motors a good example of this is described in U.K. Patent Specification No. 2,281,944.

In the hydraulic system of European Patent Specification No. 547,947 the single drive unit as mentioned above is formed from one hydraulic motor and the in-line drive units are provided by two hydraulic motors such as those described in U.K. Patent Specification No. 2,281,944. In this hydraulic system the hydraulic pump feeds one of the drives forming each of the transverse drive units through a shut off valve and also feed directly the single drive unit namely the single hydraulic motor. The single hydraulic motor in turn feeds the other drives of the transverse drive units and all the outputs of the transverse drive units are fed directly back to the hydraulic pump. There is a permanent series arrangement of the drives.

This while a relatively efficient arrangement does not overcome all the problems inherent in the use of hydraulic motors with three wheeled vehicles and in particular with three wheeled vehicles such as forklift trucks and in particular forklift trucks of the "piggy back" type which forklift trucks have relatively short wheel bases: thus, any variations between torques or speed applied to any of the wheels causes considerable difficulties in operation. Indeed an arrangement such as described in this European Patent Specification No. 547,947 does not operate particularly efficiently with such hydraulic drive systems and indeed requires an elaborate steering system to compensate for the turning of the vehicle and to prevent slippage between the various drive wheels. While it is an efficient system it is still somewhat complicated and causes difficulties in use.

OBJECTS

The present invention is directed towards overcoming the problems inherent in the use of hydraulic motors with three wheeled vehicles and in particular with three wheeled vehicles such as forklift trucks which are mounted on the rear of truck or trailer bodies in "piggy back" fashion.

SUMMARY OF THE INVENTION

According to the invention there is provided a hydraulic drive system for a vehicle having three independent wheel drive shaft assemblies in an essentially triangular configuration namely a transversely in-line pair of drive shaft assemblies and a single wheel drive shaft assembly longitudinally spaced from the in-line pair of drive shaft assemblies comprising:

a hydraulic pump;
a single drive unit, forming part of the single wheel drive shaft assembly;
at least a pair of mechanically coupled drives each having separate hydraulic input and output and forming the single drive unit;
a pair of transverse drive units forming part of the transversely in-line pair of drive shaft assemblies;
two sets of at least a pair of mechanically coupled drives each having separate hydraulic input and output each set forming one of the pairs of transverse drive units;
hydraulic fluid pipelines connecting the drive units to the hydraulic pump and to each other; and
valving in the hydraulic fluid pipelines to control the flow of hydraulic fluid between the individual drives and each other and the pump so as to operate the drive units in series or parallel.

The main advantage of this system is that it eliminates all the difficulties of skidding, wheel spin and the like: because of the arrangement there will always be sufficient torque transmitted to those wheels which are not slipping or tending to slip. By using a series arrangement a simple and effective drive system is provided. Ideally there are two separate drives in each drive unit. This particular configuration is extremely effective in that it allows different speeds to be provided and in particular when operating in parallel the hydraulic system allows the forklift truck for example to be driven at sufficient speed over good ground.

Ideally each drive unit comprises a pair of drives. This is a particularly simple construction.

Ideally in this latter embodiment each drive unit is a hydraulic motor which comprises:
- a plurality of cylinders housing pistons;
- input ports defining an input for each drive;
- a separate supply line connecting each input port with a number of cylinders;
- an output port defining an output for each drive; and
- a return line connecting all the cylinders to the output port.

Further the invention comprises a hydraulic system in which each drive unit is a hydraulic motor which comprises:
- a pair of input ports defining an input for each drive;
- an even number of cylinders of equal capacity housing pistons;
- a separate supply line for each half of the cylinders connected to each of the two input ports;
- an output port; and
- a return line connecting all the cylinders to the output port.

This allows a doubling of speed in parallel operation. Additionally, according to the invention the hydraulic drive system comprises:
- a booster pump;
- a hydraulic pump by-pass line across the hydraulic pump incorporating the booster pump;
- a pair of non-return valves in the hydraulic pump by-pass line set to feed top up oil to the hydraulic drive system on a preset reduction in line pressure; and
- a separate pair of non-return valves mounted across the drives of the single drive unit and fed from the booster pump the valves being set such as to feed top up oil into the hydraulic system on a preset reduction in output pressure of the drives of the single drive unit.

This ensures that there will be no cavitation in the system.

In an alternative embodiment of the invention there is provided a hydraulic drive system comprising:
- a hydraulic pump;
- a single drive unit forming part of the single wheel drive shaft assembly;
- a plurality of mechanically coupled drives, each having a separate hydraulic input and output forming the single drive unit;
- a pair of transverse drive units forming part of the pair of transversely in-line drive shaft assemblies;
- two sets of plurality of mechanically coupled drives, each drive having a separate hydraulic input and output each set forming one of the transverse drive units;
- a primary hydraulic fluid line connecting the hydraulic pump to the input of each drive of the single drive unit and to one or more of the drives of each of the transverse drive units;
- a secondary fluid line connecting at least one and each of the remaining outputs of the drives of one of the single drive units separately to the remaining unconnected inputs of the drives of one of the transverse drive units;
- a further secondary fluid line connecting at least one and each of the remaining outputs of the drives of the other single drive unit separately to the remaining unconnected inputs of the drives of the other transverse drive unit;
- a return hydraulic fluid line connecting the output of each drive of the transverse drive units to the hydraulic pump;
- a by-pass hydraulic fluid lines each connecting across each secondary hydraulic fluid line and the return hydraulic fluid lines; and
- an on/off diverter valve mounted in each by-pass hydraulic fluid line.

The advantage of having a multiplicity of drive units forming the transverse drive units or the single drive unit is that by suitable valving it is possible to increase or decrease the ground speed. For example over good ground and similarly to increase the torque under other conditions. It is now quite common to produce hydraulic motors with more than two sets of separate cylinders.

Further the invention provides a hydraulic drive system
- a hydraulic pump;
- a single drive unit forming part of the single wheel drive shaft assembly;
- a pair of mechanically coupled drives each having separate hydraulic input and output forming the single drive unit;
- a pair of transverse drive units forming part of the transversely in-line pair of drive shaft assemblies;
- a pair of mechanically coupled drives each having separate hydraulic input and output each pair forming one of the pairs of transverse drive units;
- a primary hydraulic fluid line connecting the hydraulic pump to the input of each of the drives of the single drive unit and to the input of one of the drives of each transverse drive unit;
- a secondary hydraulic fluid line connecting the output of one of the drives of the single drive unit to the input of the other of the drives of a transverse drive unit;
- a further secondary hydraulic fluid line connecting the output of the other drive of the single drive unit to the remaining input of the drive of the other transverse drive unit;
- a return hydraulic fluid line connecting the output of each drive of the transverse drive units to the hydraulic pump;
- a pair of by-pass hydraulic fluid lines each connecting across the input and output of one of the drives of a transverse drive unit which input is connected to a secondary hydraulic fluid line;
- an on\off diverter valve mounted in each by-pass line; and
- means for operating the diverter valve for parallel and series operation of the drive units.

This is such a simple arrangement that there is almost no addition whatsoever to the circuit except for the provision of two diverter valves thus the cost of providing such a system is relatively small.

BRIEF DESCRIPTION OF THE DRAWING

Other features and advantages of the invention will be apparent from the following description taken in connection with the accompanying drawing which is a schematic view of a hydraulic drive system for a vehicle according to the invention.

DESCRIPTION OF THE PREFERRED EMBODIMENTS

Figure 1:
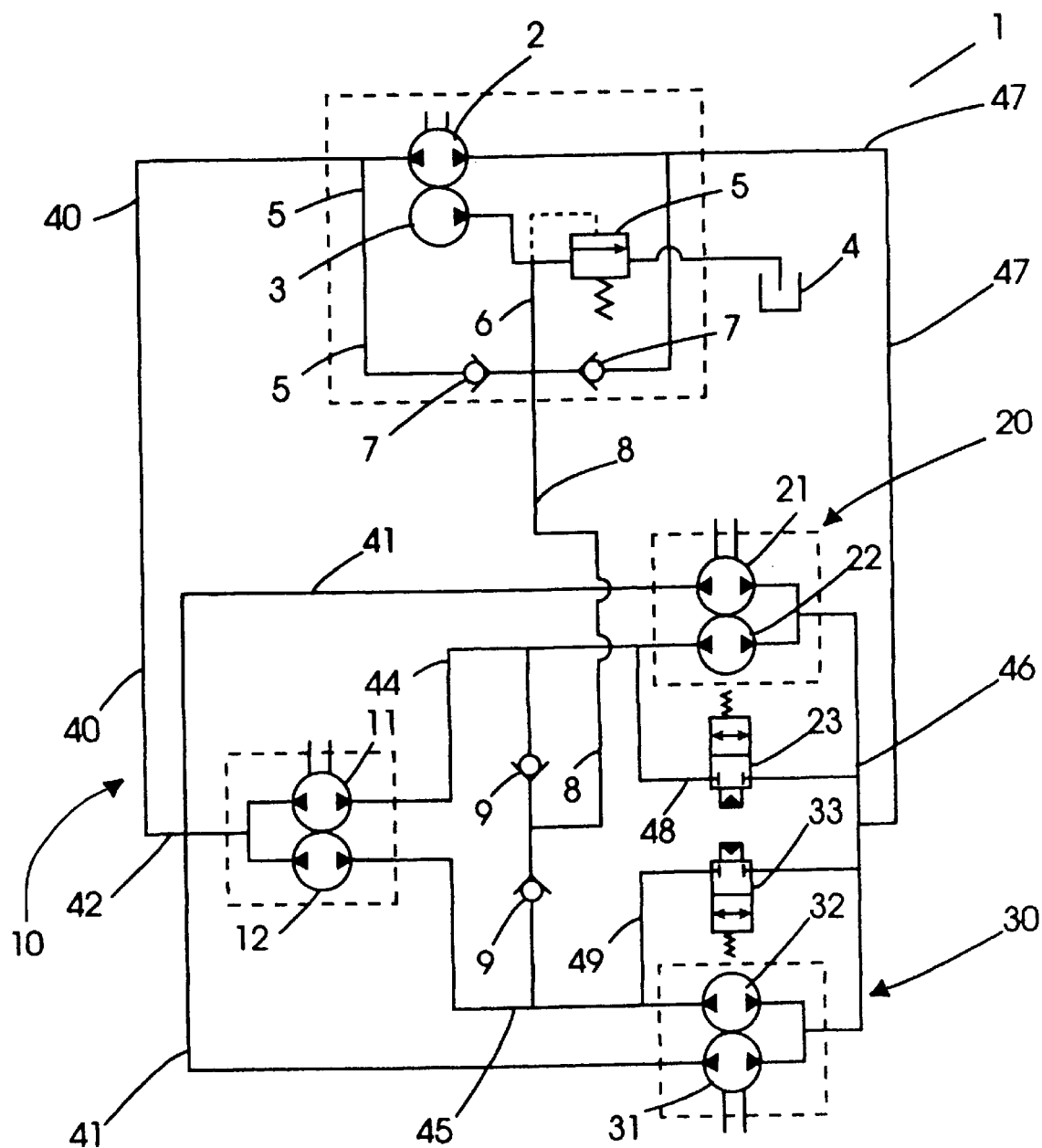

Referring to the drawings there is illustrated a hydraulic drive system, indicated generally by the reference numeral 1 comprising a hydraulic pump 2, a single drive unit 10 indicated generally by the reference numeral 10 and a pair of transverse drive units indicated generally by the reference numerals 20 and 30 respectively. Each of the drive units 10, 20 and 30 is coupled directly to a shaft forming a drive shaft assembly not illustrated as being of conventional construction. For a forklift truck of the "piggy back" type, the drive units 10, 20 and 30 each comprise two separate mechanically linked drives 11 and 12; 21 and 22; and 31 and 32 respectively. The hydraulic pump 2 has associated therewith in conventional manner a booster pump 3 and associated dump oil sump 4 fed through a valve 5. The booster pump 3 is connected by a by-pass hydraulic fluid line 6 to a pair of conventional anti-cavitation non-return valves 7. The by-pass hydraulic fluid line 6 is connected through a further line 8 to a pair of additional non-return valve 9 mounted across secondary hydraulic fluid lines 44 and 45 which are referred to in more detail below.

Across the drives 22 and 32 is mounted diverter valves 23 and 33 respectively.

Before the various pipes and connections are described in more detail the significance of the terms "input" and "output" has to be appreciated. As used in this specification they are interchangeable in that what is the input when the vehicle is travelling forward becomes the output when the vehicle is travelling in reverse. Thus the term input and output is used for one direction of flow of the pump which is presumed to drive the vehicle to which the hydraulic drive system is attached forward and thus the term input is used in this context. Further none of the pipes or line connections have been described in detail and standard connectors, valves etc. are ignored but will now be described below, the minimum number of reference being used for clarity. The hydraulic pump 2 feeds the drives 11 and 12 through a primary hydraulic fluid lines 40 and 42 as well as the drives 21 and 31 through primary hydraulic fluid lines 41. The output of the drive 11 is fed directly by the secondary fluid line 44 to the drive 22 of the transverse drive unit 20 and the output of the drive 12 is fed directly through the secondary fluid line 45 to the drive 32 of the transverse drive unit 30. Outputs of each of the drives 21, 22, 31 and 32 are fed through return hydraulic fluid lines 46 and 47 back to the input of the pump 2. The diverter valves 23 and 33 are mounted in by-pass hydraulic lines 48 and 49 between the secondary fluid lines 44 and 45 respectively and the return hydraulic fluid line 46.

In operation, with the diverter valves 23 and 33 shut the drives 11 and 12 are in series with the drives 22 and 32 respectively and thus the whole three drive units 10, 20 and 30 operate in series. According in the drive assemblies wheel spin is prevented or more strictly potential wheel spin is nullified.

When the diverter valves 23 and 33 are opened hydraulic fluid by-passes the drives 22 and 32 respectively and thus the hydraulic drive system operates in parallel, as the drives 21 and 31 as well as the drives 11 and 12 are all fed directly from the hydraulic pump 2 and return directly to it. This is particularly suitable for off site or when the terrain is not difficult.

The advantage of providing the additional non-return valves 9 is that if any cavitation were to occur in the secondary hydraulic fluid lines 44 or 45 the booster pump 3 will deliver additional oil into the system in the same way as additional oil is normally delivered into the hydraulic pump system.

It will be appreciated that reversing the hydraulic pump causes the hydraulic drive system to operate in reverse in the same manner as in the forward direction.

While the drives have been shown as separate drives they would each normally be formed from the one hydraulic motor having two individual cylinders. The motor would generally have two separate inputs and the one linked output.

Generally each hydraulic motor comprises a plurality of cylinders having pistons: a pair of input ports and a separate supply line connecting each input port with a number of cylinders. In such an arrangement there is also usually the one output port and a return line connecting all the cylinders to the output port. The cylinders are generally all of the same capacity and thus the torque can be varied by deciding how many cylinders will be connected to each input port. It is possible to have any arrangement of torques and speed though generally speaking the pumps are often divided into two separate drives of the same capacity.

Suitable means may be used to control the on/off diverter valves such as for example an operating lever in the cab of the vehicle.

The invention is not limited to the embodiments hereinbefore described which may be varied in both construction and detail.

What is claimed is:

1. A hydraulic drive system for a vehicle having three independent wheel drive shaft assemblies in an essentially triangular configuration, having a transversely in-line pair of drive shaft assemblies and a single wheel drive shaft assembly longitudinally spaced from the in-line pair of drive shaft assemblies comprising:

a hydraulic pump;

a single drive unit forming part of the single wheel drive shaft assembly;

a plurality of mechanically coupled drives, each having a separate hydraulic input and output forming the single drive unit;

a pair of transverse drive units forming part of the pair of transversely in-line drive shaft assemblies;

two sets of a plurality of mechanically coupled drives, each drive having a separate hydraulic input and output, each set forming one of the transverse drive units;

a primary hydraulic fluid line connecting the hydraulic pump to the input of each drive of the single drive unit and to one of the drives of each of the transverse drive units;

a secondary fluid line connecting each of the outputs of the drives of the single drive unit separately to unconnected inputs of the drives of one of the transverse drive units;

a further secondary fluid line connecting each of the outputs of the other drives of the single drive unit separately to unconnected inputs of the drives of the other transverse drive unit;

a return hydraulic fluid line connecting the output of each drive of the transverse drive units to the hydraulic pump;

by-pass hydraulic fluid lines each connecting across each secondary hydraulic fluid line and the return hydraulic fluid lines; and an on/off diverter valve mounted in each by-pass hydraulic fluid line.

2. A hydraulic drive system as claimed in claim 1 comprising:

a booster pump;

a hydraulic pump by-pass line across the hydraulic pump incorporating the booster pump;

a pair of non-return valves in the hydraulic pump by-pass line set to feed top up oil to the hydraulic drive system on a preset reduction in line pressure; and a separate pair of non-return valves mounted across the drives of the single drive unit and fed from the booster pump, the valves being set such as to feed top up oil into the hydraulic system on a preset reduction in output pressure of the drives of the single drive unit.

3. A hydraulic drive system for a vehicle having three independent wheel drive shaft assemblies in an essentially triangular configuration, having a transversely in-line pair of drive shaft assemblies and a single wheel drive shaft assembly longitudinally spaced from the in-line pair of drive shaft assemblies comprising:

a hydraulic pump;

a single drive unit forming part of the single wheel drive shaft assembly;

a pair of mechanically coupled drives each having separate hydraulic input and output forming the single drive unit;

a pair of transverse drive units forming part of the transversely in-line pair of drive shaft assemblies;

a pair of mechanically coupled drives each having separate hydraulic input and output, each pair forming one of the pairs of transverse drive units;

a primary hydraulic fluid line connecting the hydraulic pump to the input of each of the drives of the single drive unit and to the input of one of the drives of each transverse drive unit;

a secondary hydraulic fluid line connecting the output of one of the drives of the single drive unit to the input of the other of the drives of a transverse drive unit;

a further secondary hydraulic fluid line connecting the output of the other drive of the single drive unit to the unconnected input of the drive of the other transverse drive unit;

a return hydraulic fluid line connecting the output of each drive of the transverse drive units to the hydraulic pump;

a pair of by-pass hydraulic fluid lines each connecting across the input and output of one of the drives of a transverse drive unit which input is connected to a secondary hydraulic fluid line;

an on/off diverter valve mounted in each by-pass line; and means for operating the diverter valves with both closed or opened for parallel and series operation, respectively, of the drive units.

4. A hydraulic drive system as claimed in claim 3 comprising:

a booster pump;

a hydraulic pump by-pass line across the hydraulic pump incorporating the booster pump;

a pair of non-return valves in the hydraulic pump by-pass line set to feed top up oil to the hydraulic drive system on a preset reduction in line pressure; and a separate pair of non-return valves mounted across the drives of the single drive unit and fed from the booster pump, the valves being set such as to feed top up oil into the hydraulic system on a preset reduction in output pressure of the drives of the single drive unit.

* * * * *